United States Patent [19]
Sowers

[11] Patent Number: 6,047,478
[45] Date of Patent: Apr. 11, 2000

[54] TELESCOPING LEVEL APPARATUS AND METHOD

[76] Inventor: David A. Sowers, 4411 NW. 105th Ter., Coral Springs, Fla. 33065

[21] Appl. No.: 08/933,356

[22] Filed: Sep. 18, 1997

[51] Int. Cl.[7] .................................................. G01C 9/26
[52] U.S. Cl. ................................. 33/379; 33/809; 33/374
[58] Field of Search ........................... 33/374, 375, 379, 33/380, 381, 382, 383, 464, 809

[56] References Cited

U.S. PATENT DOCUMENTS

| | | | |
|---|---|---|---|
| 2,356,544 | 8/1944 | Swanson | 33/809 |
| 2,551,524 | 5/1951 | Bullivant | 33/374 |
| 3,104,477 | 9/1963 | Edwill | 33/374 |
| 3,243,888 | 4/1966 | Redding | 33/374 |
| 4,099,331 | 7/1978 | Peterson et al. | 33/374 |
| 4,152,838 | 5/1979 | Cook | 33/374 |
| 4,607,437 | 8/1986 | McSorley, Sr. et al. | 33/375 |
| 4,733,475 | 3/1988 | Youmans | 33/374 |
| 4,894,925 | 1/1990 | Langmaid | 33/374 |
| 4,910,876 | 3/1990 | Channell | 33/374 |
| 5,433,011 | 7/1995 | Scarborough et al. | 33/374 |

FOREIGN PATENT DOCUMENTS

| | | | |
|---|---|---|---|
| 871520 | 3/1953 | Germany | 33/809 |
| 305086 | 10/1968 | Sweden | 33/374 |

*Primary Examiner*—G. Bradley Bennett
*Attorney, Agent, or Firm*—Frank L. Kubler

[57] ABSTRACT

A level apparatus for spanning two spaced apart building structure points and indicating whether the points are level relative to each other includes an elongate tubular segment having a tubular segment longitudinal abutment face for abutting a building structure point; an extension segment slidably retained within the tubular segment for slidingly extending partly out of the tubular segment and having an extension segment longitudinal abutment face for functionally extending the tubular segment longitudinal abutment face when the extension segment is extended; and a longitudinally oriented bubble site glass. A method of testing whether first and second spaced apart points on a building structure are level relative to each other, using the above-described apparatus, includes the steps of pulling the extension segment outward from the tubular segment; placing the tubular segment against the first building structure point and the extension segment against the second building structure point; and observing the position of the bubble in the site glass to determine whether the first and second building structure points are level relative to each other.

11 Claims, 3 Drawing Sheets

TELESCOPING LEVEL APPARATUS AND METHOD

BACKGROUND OF THE INVENTION

1. Field of the Invention

The present invention relates generally to the field of construction and building tools. More specifically the present invention relates to a telescoping spirit level apparatus capable of spanning closely spaced apart as well as widely spaced apart structural points and then contracting in length for compact transport and storage. In this way the level apparatus replaces the several levels of varying lengths normally carried by workers to construction sites.

The level apparatus includes an elongate tubular segment and two extension segments slidably retained within opposing ends of the tubular segment. The tubular segment and extension segments contain at least one curved glass tube or a transparent capsule having a curved bore, the glass tube or bore being filled with alcohol or other suitable liquid containing a bubble which always seeks the highest location in the tube, herein after referred to as a bubble site glass. A level apparatus in the form of a square is also provided having bubble site glasses and having extension segments which telescope out of the arms of the square. A method of extending one of the extension segments from the tubular segment and then placing the apparatus across two building points to determine their relative levelness is also provided.

2. Description of the Prior Art

There have long been levels for testing whether two spaced apart points on a building structure are level with respect to each other. These devices have essentially included elongate bars having planar elongate abutment side faces and having cut-out portions containing bubble site glasses. Each cut-out portion opens out of a display face perpendicular to the abutment side faces, and some of the site glasses are oriented longitudinally and some are oriented laterally relative to the elongate bar, for leveling with the bar turned either vertically and horizontally.

A problem with these prior levels has been that they have a fixed length which is either too long for positioning between certain elements of a building structure or is too short to span the two points to be tested. As a result, construction crews often carry several levels of differing lengths to meet a variety of size needs. Purchasing several levels becomes expensive and the levels themselves become space consuming and awkward to carry.

The practical utility of squares has also been limited by the reach of the arms of the square, and the inability of the square to test for levelness as well as for perpendicularity.

It is thus an object of the present invention to provide a level apparatus which is short enough to span closely spaced apart building structure points and to store and transport compactly, and which is extendable longitudinally to a greater length to span more widely spaced apart building structure points, and to provide a method including the step of longitudinal extension of the level apparatus.

It is another object of the present invention to provide such a level apparatus which has a primary segment having abutment faces and longitudinal extension segments which telescopically pull out of the primary segment to increase the functional length of the level apparatus.

It is still another object of the present invention to provide such a level apparatus in which the extension segments include abutment bars mounted along opposing extension segment longitudinal edges to spring laterally outwardly to an extent that they form abutment faces substantially co-planar with primary segment abutment faces.

It is a further object of the present invention to provide such a level apparatus which is bent at a ninety degree angle at its mid-point to additionally function as a square.

It is finally an object of the present invention to provide such a level apparatus which is sturdy and economical to manufacture.

SUMMARY OF THE INVENTION

The present invention accomplishes the above-stated objectives, as well as others, as may be determined by a fair reading and interpretation of the entire specification.

A level apparatus is provided for spanning two spaced apart building structure points and indicating whether the points are level relative to each other, including an elongate tubular segment having a tubular segment longitudinal abutment face for abutting a building structure point; an extension segment slidably retained within the tubular segment for slidingly extending partly out of the tubular segment and having an extension segment longitudinal abutment face for functionally extending the tubular segment longitudinal abutment face when the extension segment is extended; and a longitudinally oriented bubble site glass.

The level apparatus preferably includes two extension segments slidably retained within opposing longitudinal ends of the tubular segment for extending in opposite directions. The tubular segment and the extension segment are both of rectangular cross-section, and both have two opposing narrower longitudinal outer faces and two opposing broader longitudinal outer faces. The two narrower longitudinal outer faces of the tubular segment function as abutment faces for resting against the spaced apart building structure points, and the two broader longitudinal faces of the tubular segment function as display faces and contain the bubble site glass.

The extension segment preferably includes an elongate central body portion; a stop structure retaining the extension segment against displacement completely out of the tubular segment, and against extension beyond the point of lateral stability of the extension segment within the tubular segment; and two abutment bars having an outward faces, mounted to the narrower opposing longitudinal faces of each of the extension segments on outwardly biased bar mounting structures having stop structures for stopping outward movement of each of the abutment bars at a point at which the abutment bar outward face is substantially co-planar with the adjacent tubular segment abutment face; so that, upon pulling an extension segment outward to the extension permitted by the stop structure, both opposing abutment bars spring outwardly from the extension segment to effectively extend the tubular segment abutment face.

Each extension segment preferably includes a free end and the extension segment free end includes a laterally mounted gripping plate for grasping with user fingers to pull the extension segment outward from the tubular segment. The extension segment preferably further includes a free end and a site glass bore adjacent to the free end containing a bubble site glass.

The level apparatus preferably additionally includes a site glass port in the tubular segment positioned to register with and visually expose the extension segment site glass when the extension segment is fully retracted into the tubular segment.

The outwardly biased bar mounting structures each preferably include lateral button bores in the extension segment central body portion and a stem button slidably fitted into each of the button bores; and a spring within each button bore for biasing outwardly the stem buttons and the abutment bar mounted on the stem buttons.

The level apparatus preferably additionally includes a longitudinally oriented guide rail fastened within the tubular segment; and a longitudinal channel recessed into the extension segment and positioned to receive the guide rail when the extension segment is fitted into the tubular segment; so that the guide rail and the channel help keep the tubular segment and extension segment co-linear and stable, and for true and reliable level readings.

The extension segment stop structure preferably includes a longitudinal slot in the central body portion having a slot end; and a set screw rotatably and engagingly mounted within a threaded set screw port in a broader longitudinal outer face of the tubular segment; so that the set screw protrudes into the interior of the tubular segment and into the longitudinal slot, the length of the slot and the location of the set screw port being selected to cause the set screw to abut the slot end and stop outward movement of the extension segment at a certain point relative to the tubular segment.

The tubular segment has a longitudinal middle point and the tubular segment is optionally bent at substantially ninety degrees at the longitudinal middle point, so that the level apparatus additionally functions as a square apparatus having tubular arms and so that the extension segments are extendable from the tubular arms.

A level apparatus is also provided for spanning two spaced apart building structure points and indicating whether the points are level relative to each other, including an elongate tubular segment having a tubular segment longitudinal abutment face for abutting a building structure point; an extension segment including an elongate central body portion and being slidably retained within the tubular segment for slidingly extending partly out of the tubular segment and having an extension segment longitudinal abutment face for functionally extending the tubular segment longitudinal abutment face when the extension segment is extended; and a longitudinally oriented bubble site glass; where the extension segment includes a stop structure retaining the extension segment against displacement completely out of the tubular segment, and against extension beyond the point of lateral stability of the extension segment within the tubular segment; and an abutment bar having an outward face, mounted to a longitudinal face of the extension segment on outwardly biased bar mounting structure having a stop structure for stopping outward movement of the abutment bar at a point at which the abutment bar outward face is substantially co-planar with the adjacent tubular segment abutment face; so that, upon pulling the extension segment outward to the extension permitted by the stop structure, the abutment bar springs outwardly from the extension segment to effectively extend the tubular segment abutment face.

A method is provided of testing whether first and second spaced apart points on a building structure are level relative to each other, using the above-described apparatus, including the steps of pulling the extension segment outward from the tubular segment; placing the tubular segment against the first building structure point and the extension segment against the second building structure point; and observing the position of the bubble in the site glass to determine whether the first and second building structure points are level relative to each other. Where the apparatus tubular segment has a longitudinal middle point and where the tubular segment is bent at substantially ninety degrees at the longitudinal middle point, the method includes the additional steps of placing the apparatus against and around a portion of the building structure intended to be square; and observing the edges of the apparatus relative to the building structure portion to determine whether the building structure portion is square.

BRIEF DESCRIPTION OF THE DRAWINGS

Various other objects, advantages, and features of the invention will become apparent to those skilled in the art from the following discussion taken in conjunction with the following drawings, in which.

DETAILED DESCRIPTION OF THE PREFERRED EMBODIMENTS

Figure 1:
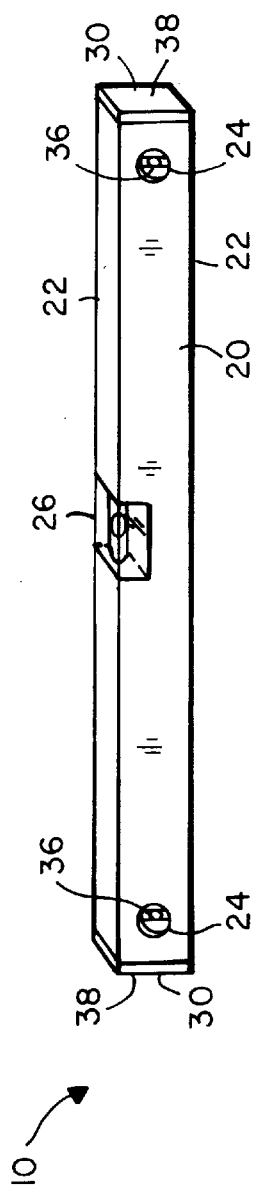
FIG. 1 is a perspective view of the first preferred embodiment of the inventive level apparatus in its shortest mode, with both extension segments retracted.
Figure 2:
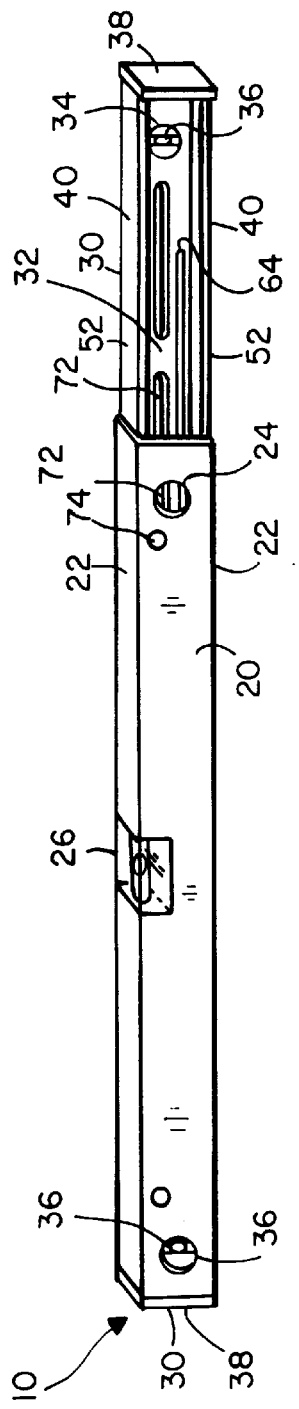
FIG. 2 is a view as in FIG. 1 with the level apparatus at intermediate mode, with one extension segment extended and the other retracted.
Figure 3:
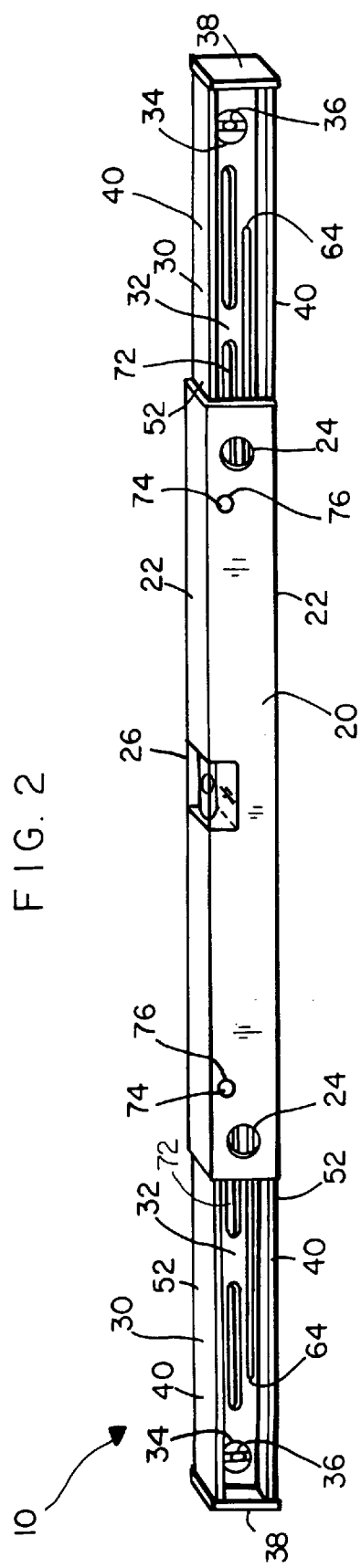
FIG. 3 is a view as in FIG. 1 with the level apparatus at its longest mode, with both extension segments extended. It is noted that more than one size of the level apparatus may be provided to handle either exceptionally long work or exceptionally short work.
Figure 4:
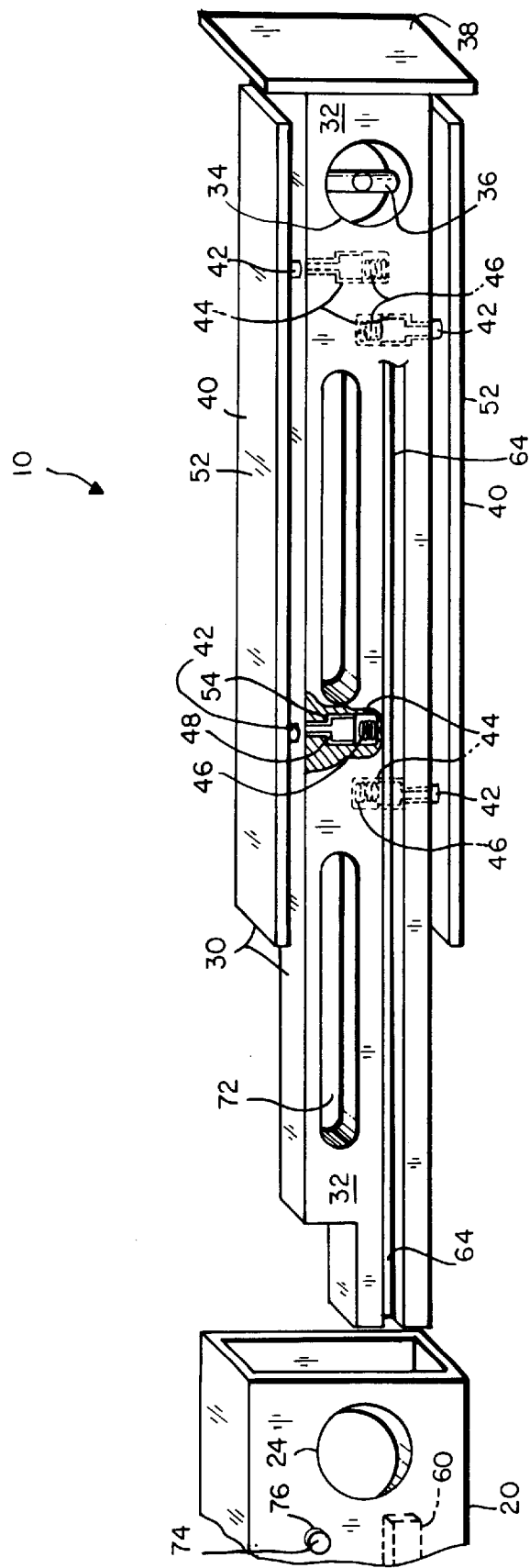
FIG. 4 is a close-up perspective view of an extension segment fully removed from the tubular segment, a broken-away end of which is shown. The central body portion is broken away to reveal a button bore and stem button, and the shoulder stop structure for the stem button.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–4, a telescoping level apparatus 10 capable of spanning closely spaced apart as well as widely spaced apart structural points, and then contracting in length for compact transport and storage, is disclosed.

Level apparatus 10 preferably includes an elongate tubular segment 20 of rectangular cross-section and two extension segments 30 slidably retained within opposing ends of tubular segment 20. The two narrower longitudinal outer faces of tubular segment 20 function as abutment faces 22 for resting against spaced apart building structure points. Tubular segment 20 preferably includes a longitudinally oriented bubble site glass capsule site glass 26 mounted within a notch to be flush with one abutment face 22 similar to those provided in conventional levels.

Each extension segment 30 includes an elongate central body portion 32 containing a free end site glass bore 34 containing a laterally oriented bubble site glass 36. See FIG. 4. A site glass port 24 is provided near each end of tubular segment 20 to register with and visually expose one of the extension segment site glasses 36 when the extension segment 30 is fully retracted into tubular segment 20. A stop structure retains each extension segment 30 against pulling completely out of tubular segment 20, and against pulling out beyond the point of lateral stability. Each extension segment 30 free end includes a laterally mounted gripping plate 38 for grasping with user fingers to pull the extension segment 30 outward.

An abutment bar 40 is mounted to the narrower opposing longitudinal sides of each extension segment central body portion 32 on two stem buttons 42 slidably fitted into lateral button bores 44, biased outwardly by button springs 46 within the button bores 44 and having stop means such as button shoulders 48 and shoulder abutment surfaces 54 in bores 44 for stopping outward button 42 movement at a point at which the abutment bar 40 outward face 52 is substantially co-planar with the adjacent tubular segment abutment face 22. Thus upon pulling an extension segment 30 outward to its full distance, both opposing abutment bars 40 spring out from the sides of the extension segment 30 to effectively extend the tubular segment 20 abutment. The user squeezes and holds the bars 40 against the extension segment central body portion 32 to push the extension segment 30 back into tubular segment 20.

It is preferred for maximized structural integrity that tubular segment 20 contains a longitudinally oriented guide rail 60 fastened to a broad display wall 62 inside surface. A registering longitudinal channel 64 is recessed into each of the extension segment central body portions 32. Guide rail 60 and channel 64 help keep tubular segment 20 and extension segments 30 co-linear so that they provide true and reliable level readings.

The preferred extension segment 30 stop structure includes an elongate longitudinal slot 72 in the central body portion 32 and a set screw 74 rotatably mounted within a threaded set screw port 76 in a broad display wall 62 of tubular segment 20. Set screw 74 is preferably an Allen™ screw, and protrudes into the interior of tubular segment 20 and into slot 72. The length of slot 72 and the location of set screw port 76 are selected to cause set screw 74 to abut a slot 72 end and stop outward movement of the extension segment 30 at a desired point. Extension segment 30 stops at a point at which enough of the extension segment 30 remains within tubular segment 20 to stabilize the extension segment 30 relative to tubular segment 20 for zero or negligible buckling to achieve true leveling. An extension segment 30 may be removed from tubular segment 20 by first completely unscrewing the set screw 74, and then sliding the extension segment 30 fully out of tubular segment 20.

Level apparatus 10 has three extension modes. See FIGS. 1–3. The shortest mode is that in which both extension segments 30 are retracted into tubular segment 20. The middle mode is that in which only one extension segment 30 is extended from tubular segment 20. The longest mode is that in which both extension segments 30 are extended.

Second Preferred Embodiment

Figure 5:
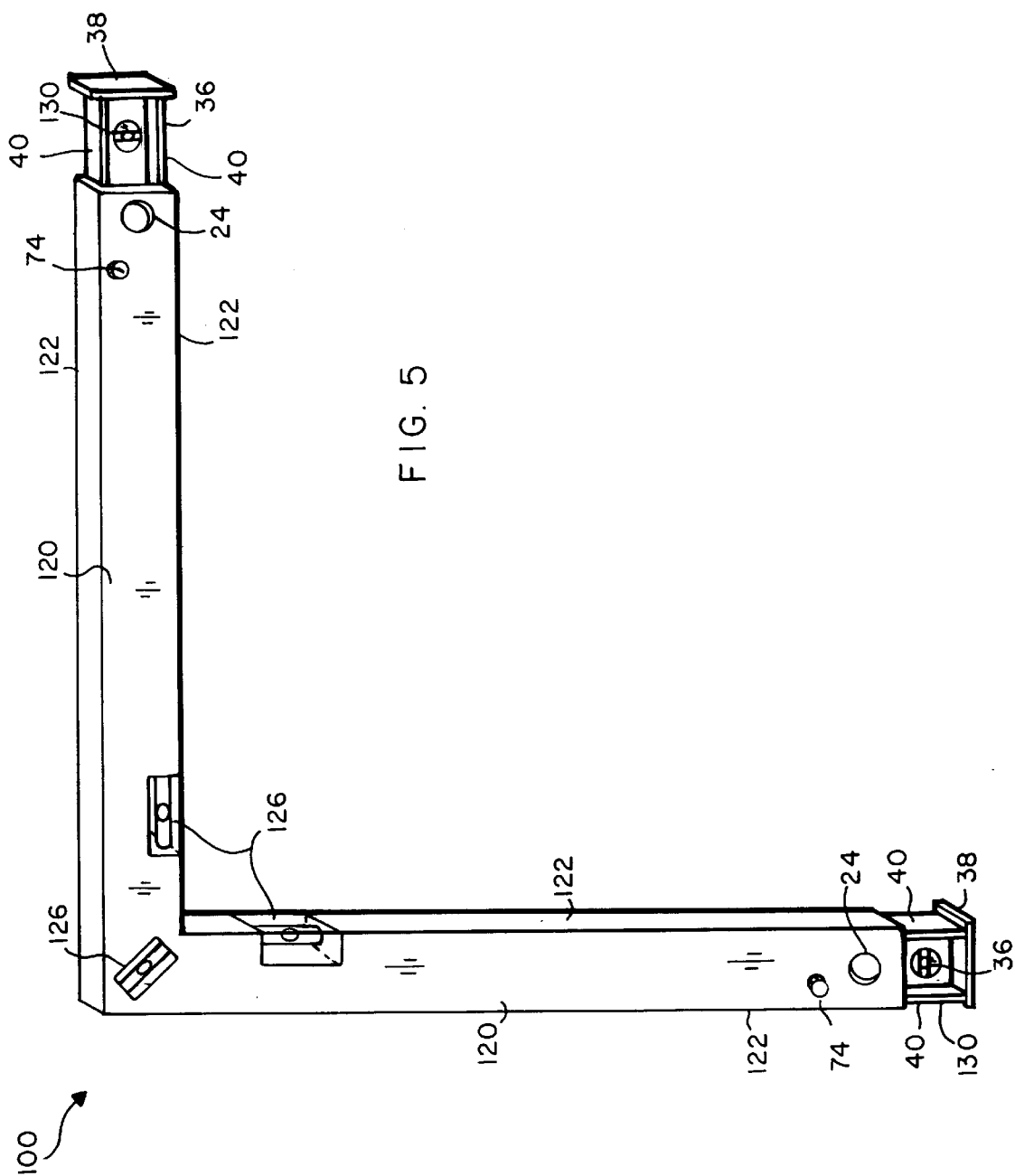
FIG. 5 is a second embodiment of the inventire level apparatus.

The second embodiment is like the first except that tubular segment 20 is angled at ninety degrees at its middle point, so that level apparatus 10 becomes a square apparatus 100 with tubular arm extension segments 130. See FIG. 5. A capsule site glass 128 is inset into notches in the tubular segment 120 on either side of the bend, flush with the square apparatus 100 abutment faces 122. Abutment bars 140 and all of the other structural elements of extension segments 30 of the first embodiment are provided.

Method

In practicing the invention, the following method may be used. For the first embodiment, the steps include pulling an extension segment 30 outward from tubular segment 20; placing tubular segment 20 against a first building structure point and the extension segment 30 against a second building structure point spaced apart from the first building structure point; and observing the position of the bubble in one of the site glasses 26 to determine whether the first and second building structure points are level relative to each other.

For the second embodiment, the steps additionally include placing the square apparatus 100 against and around a portion of a building structure intended to be square; observing the edges of square apparatus 100 relative to the building structure portion to determine whether the building structure portion is square.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim as my invention:

1. A level apparatus for spanning two spaced apart building structure points and indicating whether the points are level relative to each other, comprising:

an elongate tubular segment having a tubular segment longitudinal abutment face for abutting a building structure point;

an extension segment slidably retained within the tubular segment for slidingly extending partly out of said tubular segment and having an extension segment longitudinal abutment face for functionally extending the tubular segment longitudinal abutment face when said extension segment is extended;

and a longitudinally oriented bubble site glass;

wherein said tubular segment and said extension segment are both of rectangular cross-section, and both have two opposing narrower longitudinal outer faces and two opposing broader longitudinal outer faces;

and wherein said extension segment comprises an elongate central body portion; a stop structure retaining said extension segment against displacement completely out of said tubular segment, and against extension beyond the point of lateral stability of said extension segment within said tubular segment; and two abutment bars having an outward faces, mounted to the narrower opposing longitudinal faces of each said extension segment on outwardly biased bar mounting means having stop means for stopping outward movement of each said abutment bar at a point at which the abutment bar outward face is substantially co-planar with the adjacent tubular segment abutment face; such that, upon pullinq an extension segment outward to the extension permitted by said stop structure, both opposing abutment bars spring outwardly from the extension segment to effectively extend the tubular segment abutment face.

2. The level apparatus of claim 1, comprising two said extension segments slidably retained within opposing longitudinal ends of said tubular segment for extending in opposite directions.

3. The level apparatus of claim 1, wherein the two narrower longitudinal outer faces of said tubular segment function as abutment faces for resting against said spaced apart building structure points, and said two broader longitudinal faces of said tubular segment function as display faces and contain said bubble site glass.

4. The level apparatus of claim 1, wherein said extension segment comprises a free end and said extension segment free end comprises a laterally mounted gripping plate for grasping with user fingers to pull said extension segment outward from said tubular segment.

5. The level apparatus of claim 1, wherein said extension segment comprises a free end and a site glass bore adjacent said free end containing a bubble site glass.

6. The level apparatus of claim 5, additionally comprising a site glass port in said tubular segment positioned to register with and visually expose said extension segment site glass when said extension segment is fully retracted into said tubular segment.

7. The level apparatus of claim 1, wherein said outwardly biased bar mounting means each comprise:
   lateral button bores in said extension segment central body portion and a stem button slidably fitted into each of said button bores;
   and a spring within each said button bore for biasing outwardly said stem buttons and the abutment bar mounted on said stem buttons.

8. The level apparatus of claim 1, additionally comprising:
   a longitudinally oriented guide rail fastened within said tubular segment;
   and a longitudinal channel recessed into said extension segment and positioned to receive said guide rail when said extension segment is fitted into said tubular segment;
   such that said guide rail and said channel help keep the tubular segment and extension segment co-linear and stable, and for true and reliable level readings.

9. The level apparatus of claim 1, wherein said extension segment stop structure comprises:
   a longitudinal slot in said central body portion having a slot end;
   and a set screw rotatably and engagingly mounted within a threaded set screw port in a broader longitudinal outer face of said tubular segment;
   such that said set screw protrudes into the interior of said tubular segment and into said longitudinal slot, the length of said slot and the location of said set screw port being selected to cause said set screw to abut said slot end and stop outward movement of said extension segment at a certain point relative to said tubular segment.

10. The level apparatus of claim 2, wherein said tubular segment has a longitudinal middle point and wherein said tubular segment is bent at substantially ninety degrees at said longitudinal middle point, such that said level apparatus additionally functions as a square apparatus having tubular arms and such that said extension segments are extendable from said tubular arms.

11. A level apparatus for spanning two spaced apart building structure points and indicating whether the points are level relative to each other, comprising:
   an elongate tubular segment having a tubular segment longitudinal abutment face for abutting a building structure point;
   an extension segment comprising an elongate central body portion and being slidably retained within the tubular segment for slidingly extending partly out of said tubular segment and having an extension segment longitudinal abutment face for functionally extending the tubular segment longitudinal abutment face when said extension segment is extended;
   and a longitudinally oriented bubble site glass;
   wherein said extension segment comprises a stop structure retaining said extension segment against displacement completely out of said tubular segment, and against extension beyond the point of lateral stability of said extension segment within said tubular segment; and an abutment bar having an outward face, mounted to a longitudinal face of said extension segment on outwardly biased bar mounting means having stop means for stopping outward movement of said abutment bar at a point at which the abutment bar outward face is substantially co-planar with the adjacent tubular segment abutment face; such that, upon pulling said extension segment outward to the extension permitted by said stop structure, said abutment bar springs outwardly from the extension segment to effectively extend the tubular segment abutment face.

* * * * *